June 12, 1951 W. C. RENNE 2,556,443

GUMMED TAPE APPLIER

Filed Nov. 6, 1947 4 Sheets-Sheet 1

INVENTOR,
William C. Renne.
BY Roy E. Hamilton,
Attorney.

INVENTOR,
William C. Renne.
BY Roy E. Hamilton,
Attorney.

June 12, 1951 W. C. RENNE 2,556,443

GUMMED TAPE APPLIER

Filed Nov. 6, 1947 4 Sheets-Sheet 3

INVENTOR.
William C. Renne.

BY Roy E. Hamilton,
Attorney.

June 12, 1951 W. C. RENNE 2,556,443

GUMMED TAPE APPLIER

Filed Nov. 6, 1947 4 Sheets-Sheet 4

INVENTOR,
William C. Renne.
BY Roy E. Hamilton,
Attorney.

Patented June 12, 1951 2,556,443

UNITED STATES PATENT OFFICE

2,556,443

GUMMED TAPE APPLIER

William C. Renne, Kansas City, Mo.

Application November 6, 1947, Serial No. 784,343

14 Claims. (Cl. 216—29)

1

This invention relates to new and useful improvements in a gummed tape applier, and has particular reference to appliers of the hand operated, portable type.

The principal object of the present invention is the provision of a hand operable gummed tape applier whereby gummed tape carried on a roll within said applier is drawn from said roll, moistened, ejected to any desired length, and cut off.

Another object is the provision, in a gummed tape applier of the class described, of a rotatable drum whereby tape ejected as described may be applied under pressure to a package or other surface.

A further object is the provision of a gummed tape applier having a pair of relatively pivoted handle members, and means operable by the relative movement of said handle members whereby gummed tape is drawn from a roll carried in said applier, moistened, and cut off at any desired length.

Another object is the provision of a hand operated gummed tape applier comprising a body member adapted to carry a roll of gummed tape, a moistening roller adapted to be wetted by water carried in said body member, a drum carried rotatably by said body member and against which said moistening roller is resiliently urged, a handle member pivotally carried by said body member, means operable by the movement of said handle whereby said drum is rotated to draw tape from said roll and over said moistening roller, and means operable by said handle for cutting off said tape at any desired length.

Another object is the provision of a tape applier of the character described wherein the tape as it is ejected therefrom passes over a slot between a pair of rigid members, and having a blade manually operable to enter said slot to cut off said tape at any desired length.

Another object is the provision, in a gummed tape applier of the character described wherein tape drawn from a roll passes between rotating drums or rollers, of a drum having longitudinal radial slots formed therein, and a manually operable blade adapted to enter one of said slots to cut off said tape at any desired length.

Another object is the provision, in a gummed tape applier of the character described wherein tape drawn from a roll passes between rotatable drums on rollers, of means for manually rotating one of said drums to draw any desired length of tape from said roll, means for cutting off said tape, and means for locking said drum against further rotation at the instant said tape is cut off.

2

Other objects are simplicity and economy of construction, ease and efficiency of operation, adaptability to be used in any position, and the provision of means for preventing sticking of the moistened tape.

With these objects in view, as well as other objects which will appear in the course of the specification, reference will be had to the drawings, wherein.

Figure 8:
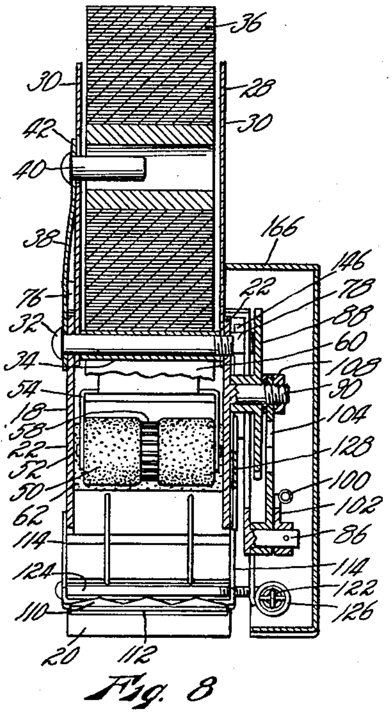
Fig. 8 is a sectional view taken on line VIII—VIII of Fig. 4, with the tape partially broken away.
Figure 9:
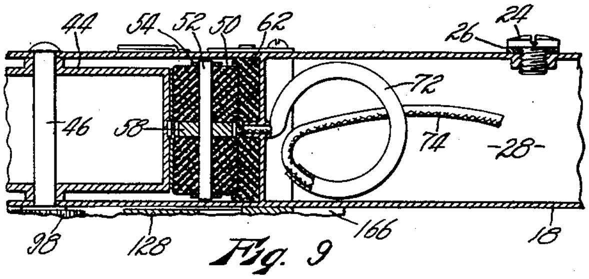
Fig. 9 is a fragmentary section taken on line IX—IX of Fig. 4.

Like reference numerals apply to similar parts throughout the several views, and the numeral 18 applies to a body member comprising a flat, hollow, substantially triangular tank portion 20 adapted to serve as a reservoir for water, the parallel side walls 22 extending forwardly from said tank. Tank 20 is provided with a filling plug 24 having a sealing washer 26. A holder 28 having parallel side walls 30 is rigidly mounted between the forwardly extended portions of tank walls 22 by means of a bolt 32 extending therebetween, side walls 30 being maintained in spaced apart relation by means of a sleeve 34 carried on bolt 32, as best shown in Fig. 8. Holder 28 extends above side walls 22, and is adapted to carry a roll of gummed tape 36. As best shown in Fig. 8, a leaf spring 38 is secured rigidly at its lower end to bolt 32, and at its upper end is provided with a detent 40 adapted to extend inwardly through a slot 42 provided therefor in holder wall 30 and into the core of tape roll 36. Thus the roll is rotatably secured in the holder, but may be easily replaced by retracting detent 40 therefrom.

A drum 44 is rigidly mounted on a shaft 46 extending between and carried for rotation by side walls 22, said drum extending beneath the lower edges of said side walls. Said drum is formed to present a relatively narrow band of gear teeth 48 extending circumferentially therearound. Said gear teeth extend outwardly from the surface of said drum very slightly.

Figure 1:
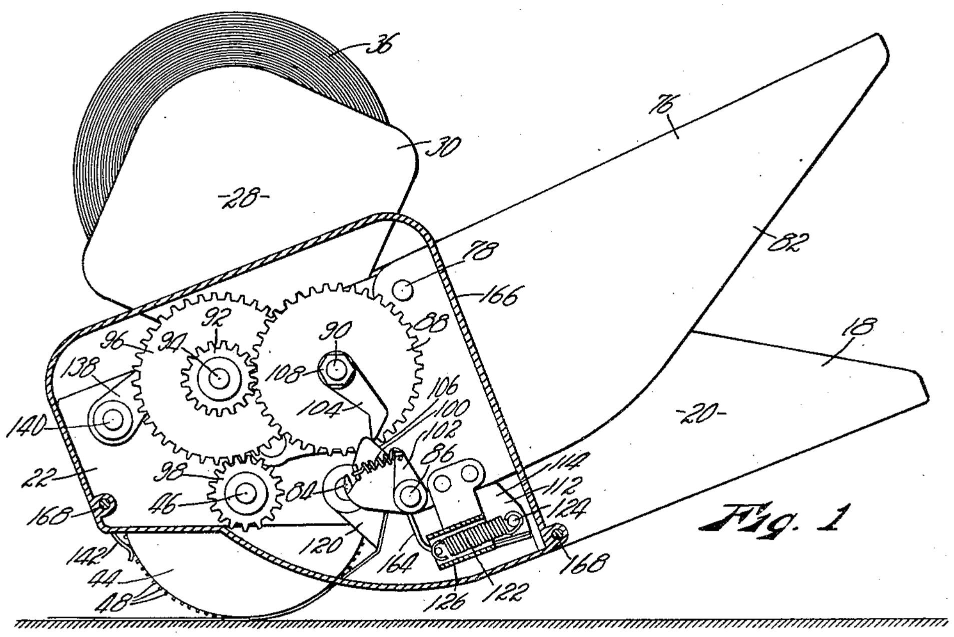
Figure 1 is a side elevation of a gummed tape applier embodying the present invention, partially broken away, shown in operative relationship to a surface to which tape is being applied.
Figure 2:
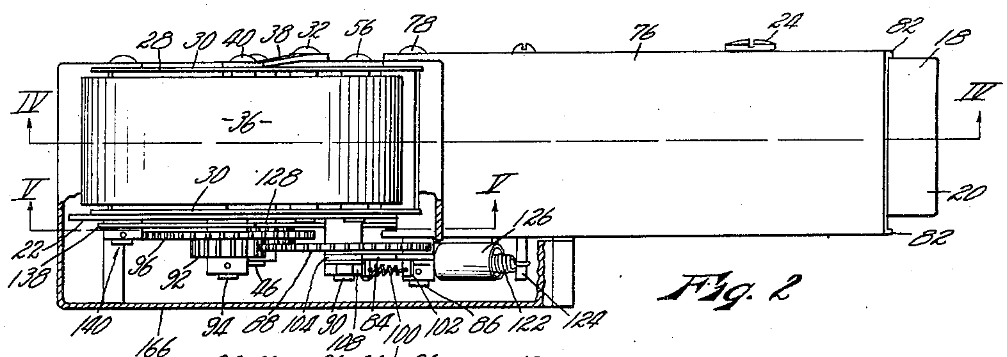
Fig. 2 is a plan view of the applier, partially broken away.
Figure 3:
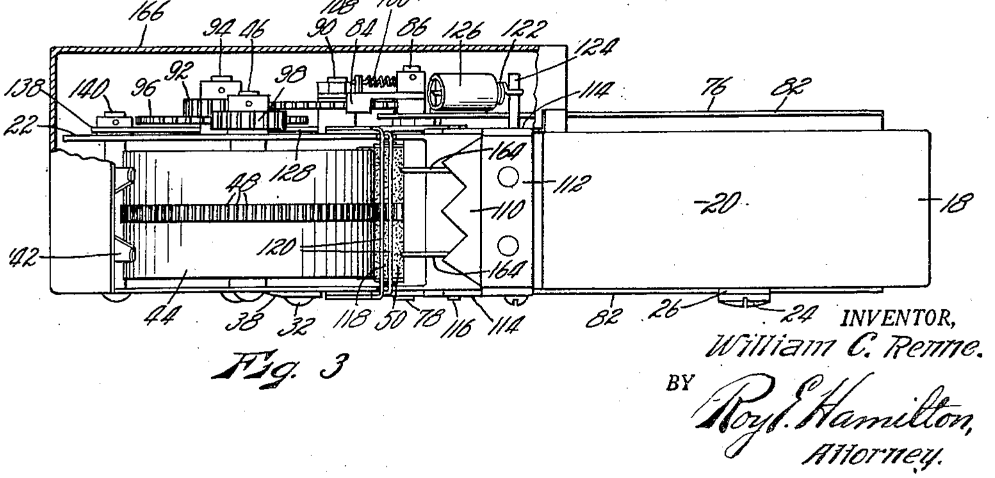
Fig. 3 is an inverted plan view of the applier, partially broken away and with the tape not shown.
Figure 4:
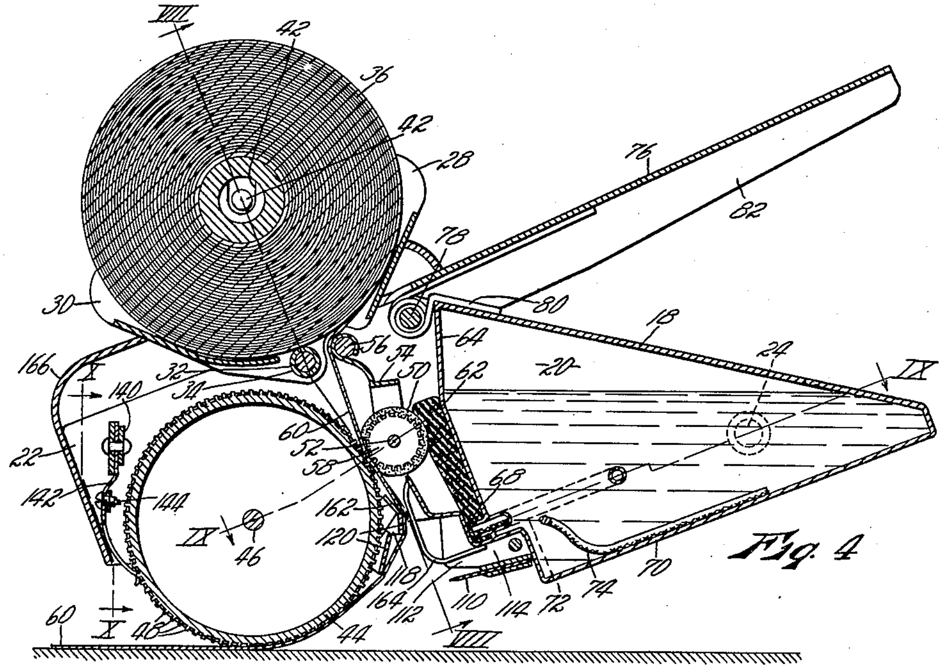
Fig. 4 is a vertical mid-section taken on line IV—IV of Fig. 2.

A moistening roller 50 is carried rotatably on a shaft 52 parallel to shaft 46, shaft 52 being carried in a spring bracket 54 secured at its upper end to a bolt 56 extending between side walls 22 adjacent the upper edges thereof. Said bracket is adapted to urge roller 50 resiliently against drum 44. As best shown in Fig. 8, said roller is comprised of a resilient, porous material such as sponge rubber, and is provided with a central gear wheel 58 adapted to mesh with gear teeth 48 of drum 44. As shown in Fig. 4 the end portion 60 of the tape from roll 36 is passed downwardly between bolts 32 and 56 and between drum 44 and roller 50. By adjusting the tension of spring bracket 54, the tape may be gripped firmly between gear 58 and gear teeth 48 without appreciably cutting or multilating said tape. The tape is so positioned that the gummed side thereof contacts roller 50, and gear 58 is of slightly smaller diameter than the sponge rubber roller 50 so that the sponge rubber will be slightly compressed as it contacts the tape, thereby forcing water from said roller to moisten the gummed side of said tape.

At its rearward side, roller 50 passes in wiping contact with a pad 62 of sponge rubber or similar material adjacent the upper end thereof, said pad being supported against the front wall 64 of tank 20. Said pad fits snugly at its lower end into a well 68 formed by the forward and upward extension of tank bottom 70. Said bottom is further extended forwardly and upwardly to a point adjacent the lower side of roller 50, thereby forming a well adapted to collect water forced from said roller as it contacts pad 62. A tube 72 interconnects well 68 with tank 20 through wall 64. Said tube is formed in a loop within tank 20 in order to prevent an excess flow of water from the tank to well 68. A wick 74 extends through tube 72 and falls loosely within tank 20 in order to insure a constant supply of moisture to pad 62 and roller 50 as long as water remains in the tank, regardless of the position in which the applicator may be placed.

Drum 44 is driven by the following mechanism. A sheet metal handle member 76 is pivotally connected to body member 18 adjacent the upper front corner of the tank portion thereof by means of pivot pin 78, and forms a scissors-type hand grip in conjunction with said tank portion. A helical spring 80 carried on said pivot pin maintains handle member 76 normally in its open position. The side portions of said handle portion are turned downwardly to form side walls 82 adjacent side walls 22 of body member 18. A pawl 84 is pivotally carried on a stub shaft 86 extending outwardly from one of side walls 82 adjacent the lower forward corner thereof, and is adapted to engage a gear 88 carried for rotation on a stub shaft 90 extending outwardly from side wall 22 of body member 18.

Gear 88 meshes with gear 92 carried for rotation on stub shaft 94 extending outwardly from side wall 22, and gear 96 carried on shaft 94 and rotatable with gear 92 meshes with gear 98 rigidly mounted on the outwardly extended end of shaft 46 carrying drum 44. A tension spring 100, secured at one end to pawl 84 and at its opposite end to an arm 102 rigidly carried by stub shaft 86, urges pawl 84 into engagement with gear 88. Thus whenever handle member 76 is depressed, drum 44 is rotated through the above described gear train to draw tape from roll 36. By repeatedly operating handle 76, any desired length of tape may be drawn from the roll. A finger 104 rigidly secured to shaft 90 is adapted to contact cam surface 106 of pawl 84 as handle 76 approaches its upper position and thereby force said pawl out of engagement with gear 88. By turning finger 104 on shaft 90, and fixing its position thereon by means of lock nut 108, the point in the oscillation of handle 76 at which the pawl engages gear 88 may be varied, and thus the length of tape which is ejected for one oscillation of said handle may be adjusted.

A serrated blade 110 extending transversely relative to the face of drum 44 is carried by a U-shaped bracket 112 having its leg portions 114 pivotally secured to opposite side walls 22 at 116 to the rear of drum 44. Said blade when pivoted forwardly enters a slot 118 formed between two bar members 120 extending between and rigidly secured to side walls 22 adjacent drum 44. Since the tape passes over slot 118 after passing between drum 44 and roller 50, as shown in Fig. 4, it is apparent that the tape will be cut off whenever blade 110 enters the slot.

Figure 7:
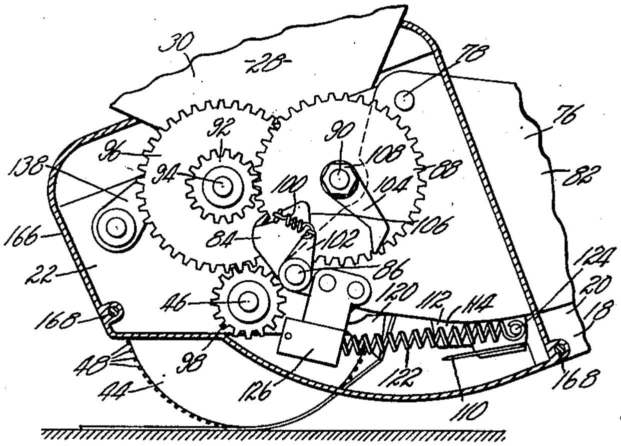
Fig. 7 is a fragmentary view of the parts shown in Fig. 1, with the parts in the relative positions assumed immediately prior to the release of the cutting blade.

A tension spring 122 is secured at one end to a pin 124 carried by bracket 112, and at its opposite end to a sleeve bracket 126 mounted on handle member 76 adjacent stub shaft 86. Whenever handle 76 is depressed, spring 122 is extended to urge blade bracket 112 forwardly, as best shown in Fig. 7, said bracket being released by a trigger mechanism hereinafter described when handle 76 has been fully depressed. When the handle is released, spring 122 becomes fully compressed and pushes bracket 112 rearwardly to its normal position. The inclusion of the major portion of the spring within sleeve 126 prevents it from buckling during the return movement.

Figures 5, 6:
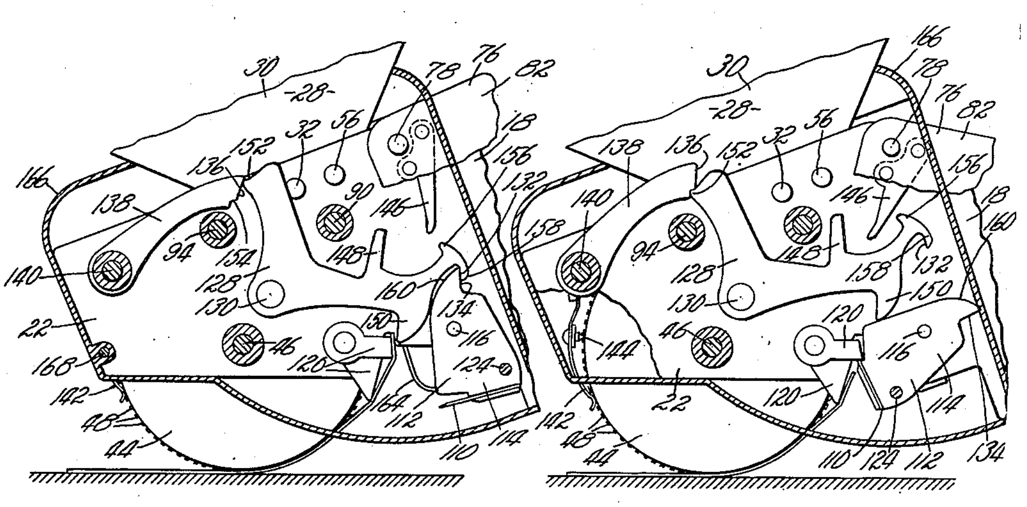
Fig. 5 is a fragmentary vertical section taken on line V—V of Fig. 2, showing the blade and trigger assembly at its normal or rest position.
Fig. 6 is a view of the parts shown in Fig. 5, with the blade and trigger assembly shown in the tripped position.
Figure 10:
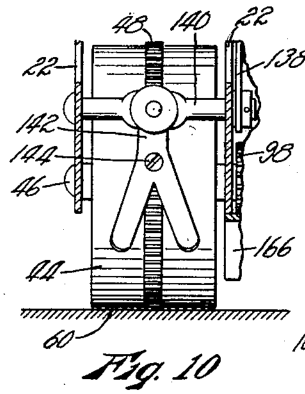
Fig. 10 is a fragmentary section taken on line X—X of Fig. 4.

Referring to Fig. 5, it will be seen that blade bracket 112 is normally held in its rearward position by an angled trigger plate 128 pivotally secured to side wall 22 at 130, a shoulder 132 of said trigger engaging a shoulder 134 formed in the leg portion 114 of bracket 112. The opposite leg of trigger 128 contacts cam surface 136 of an arm 138 rigidly secured at its opposite end to the outwardly extended end of a shaft 140 extending between and rotatably supported by side walls 122 adjacent the forward edge of drum 44. A leaf spring 142 is rigidly secured at one end to the flattened central portion of said shaft, said spring being bifurcated at its opposite end and adapted to bear resiliently against drum 44 at either side of gear teeth 48, as shown in Fig. 10. Secured to spring 142 intermediate its ends is an inwardly projecting detent 144 adapted to project into teeth 48 of drum 44 to arrest the rotation thereof. Spring 142 urges shaft 140 in a clockwise direction as viewed in Fig. 5 and normally maintains detent 144 out of engagement with gear tetth 48.

When handle 76 has been almost fully depressed, a finger 146 fixed to the inner surface of side wall 82 of handle 76 adjacent pivot pin 78 contacts finger 148 of trigger plate 128 and causes said trigger plate to be pivoted counter-clockwise as viewed in Fig. 5. Thus shoulder 134 of blade bracket 112 is freed from shoulder 132 of trigger plate 128 and said bracket is pivoted forwardly by spring 122 and blade 110 enters slot 118 to cut off the tape, as best shown in Fig. 6. Since the trigger is tripped only at the extreme position of handle 76, any desired length of tape may be pulled from roll 38 by repeatedly oscillating handle 76 through only a portion of its pivotal arc.

As blade bracket 112 pivots forwardly, the side wall 114 thereof contacts finger 150 of trigger 128 and causes said trigger to turn still further in a counterclockwise direction as shown in Fig. 6. As this occurs, the opposite arm of the trigger, acting on cam surface 136 of arm 138, causes said arm and shaft 140 to turn in a counterclockwise direction as shown in Fig. 6, until shoulder 152 of the trigger engages shoulder 154 of arm 138, thus securing said trigger and arm in the position shown in Fig. 6. As shaft 140 is turned counter-clockwise, leaf spring 142 is compressed and detent 144 is engaged between a pair of adjacent gear teeth 48, locking drum 44 against further rotation. Thus the drum is locked against rotation at substantially the same instant that the tape is cut off by blade 110. This prevents the feeding of tape against blade 110 when said blade is in its forward position, and the consequent bunching or wadding of the tape above the blade.

As handle 76 is pivoted upwardly by spring 90, blade bracket 112 is pivoted rearwardly by spring 122 as previously described. Then finger 146 fixed to handle 76 contacts finger 156 of trigger 128, pivoting said trigger clockwise to release shoulder 152 of said trigger from shoulder 154 of arm 138. Arm 138 then is pivoted clockwise by leaf spring 142 to withdraw detent 144 from gear teeth 48 to unlock drum 44. Cam surface 136 of arm 138, acting on trigger 128, urges finger 158 downwardly against cam surface 160 of side wall 114 of blade bracket 112 is pivoted rearwardly until shoulder 132 of said trigger falls behind shoulder 134 of said blade bracket. The cycle may then be repeated indefinitely by repeatedly oscillating handle 76.

The upper of bars 120 forming slot 118 is provided at its upper edge with a forwardly turned ear 162 as shown in Fig. 4, projecting to a point closely adjacent the surface of drum 44 to prevent the tape from passing between said drum and bars 120. A pair of spaced apart parallel wires 164 are secured at their ends to the forwardly extended portions of tank bottom 10, and are looped forwardly to a position adjacent the gummed side of tape 60. These wires prevent the tape from contacting blade 110 in its rearward position. Also, the short moistened end portion of the tape which remains after the remainder has been cut off can contact only said wires. The small area of contact aids in preventing sticking of said moistened tape end during periods of non-use. Furthermore, it has been found that moistened tape end, since it is short, will remain moist so long as moistening roller 50 remains moist. Thus it is believed that there will be virtually no sticking or jamming of the tape. A cover 166 is removably secured to side wall 22 by means of screws 168, and encloses the gearing and trigger mechanism.

In the modified form shown in Figs. 11 to 16, a solid drum 170 is rigidly mounted on shaft 46 in place of drum 44 used in the preferred form, drum 170 being substantially wider than the tape being used and being provided with a plurality of circumferentially spaced apart longitudinal radial slots 172. Moistening roller 50 is identical to that used in the preferred form except that it is provided with a central disc 174 of hard rubber or similar material instead of a gear, said disc being resiliently urged against drum 170 by bracket 54. Said moistening roller is supplied with moisture from tank 20 in the same manner as employed in the preferred form. A handle member 176 is pivotally connected to body member 18 by means of bolt 32, and is provided with downwardly turned side walls 178 adjacent side walls 22 of body member 18. Said handle is normally urged toward its upper position by a compression spring 180 carried between said handle and body member 18 on a rod 182.

A pawl 184 is pivotally carried on a stub shaft 186 extending outwardly from side wall 178 adjacent the lower forward edge thereof, and is adapted to engage gear 88 during the downward stroke of handle 176. A spring 188 carried on stub shaft 186 urges said pawl into engagement with said gear. The gear train used for driving drum 170 is substantially similar to that used in the preferred form.

Figure 16:
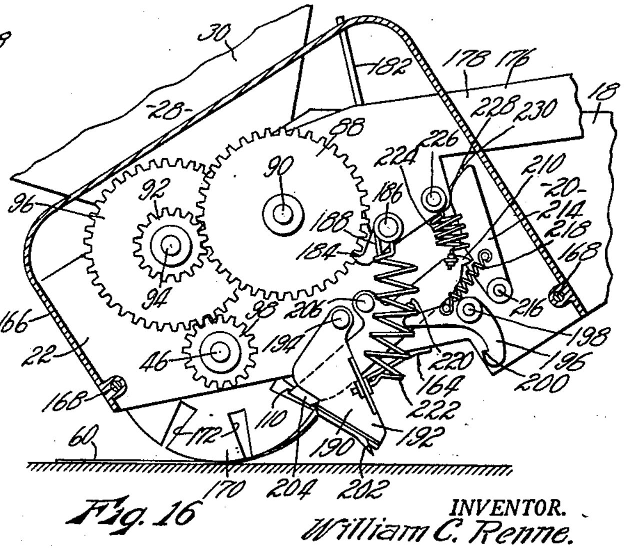
Fig. 16 is a view of the parts shown in Fig. 11, showing the relationship of the parts after the blade has been released and has entered one of the drum slots.
Figures 11, 12, 13, 14:
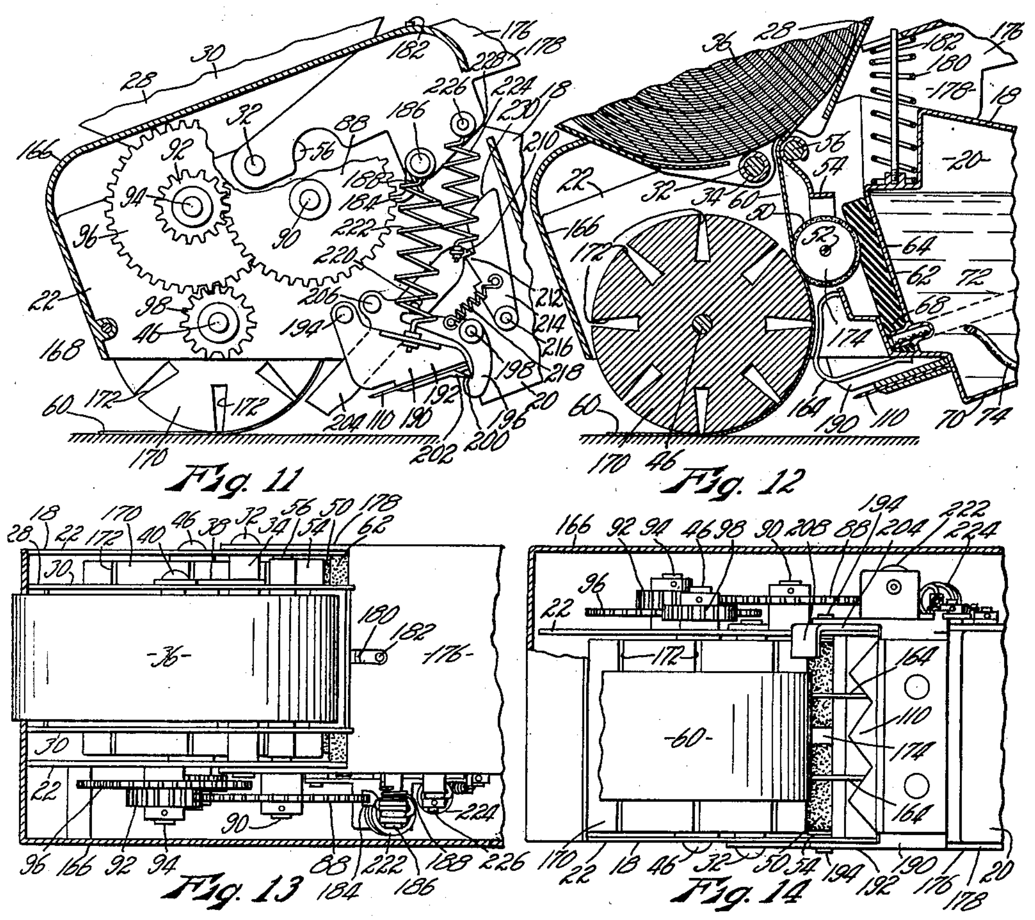
Fig. 11 is a fragmentary side elevation, partially broken away, of a modified form of a gummed tape applier embodying the present intion.
Fig. 12 is a fragmentary longitudinal mid-section of the applier shown in Fig. 11.
Fig. 13 is a plan view of the parts shown in Fig. 11, with the cover partially broken away.
Fig. 14 is an inverted plan view of the parts shown in Fig. 11, with the cover partially broken away.

Blade 110 is carried by a U-shaped bracket 190 having its leg portions 192 pivotally carried by side walls 22 at 194 and extending beneath the lower edges of said side walls. Said blade is adapted to enter one of notches 172 of drum 170 when bracket 190 is pivoted forwardly, as shown in Fig. 16. Said bracket is normally held in its rearward position by an angled trigger 196 pivotally mounted on side wall 22 at 198, shoulder 200 of said trigger engaging ear 202 of said bracket. An elongated finder bar 204 is pivotally mounted on side wall 22 at 206 adjacent pivot 194 of blade bracket 190. Said finder bar is provided at its forward end with an inwardly turned portion 208 normally disposed in closely spaced apart relation to the surface of drum 170, substantially within the pivotal orbit of blade 110. Finder bar 204 is provided at its rearward end with a shoulder 210 normally engaged by step 212 of a trigger 214 pivotally secured to side wall 22 at 216. A tension spring 218 connecting triggers 196 and 214 serves to urge trigger 214 into engagement with bar 204, and to urge trigger 196 against a pin 220 fixed in bar 204. A helical spring 222 is fixed at its lower end to blade bracket 190 and at its upper end is pivotally connected to stub shaft 186 carried by handle 176.

A helical spring 224 is fixed at its lower end to finder 204 adjacent shoulder 210, and at its upper end is pivotally connected to a stub shaft 226 projecting outwardly from handle 176.

Figure 15:
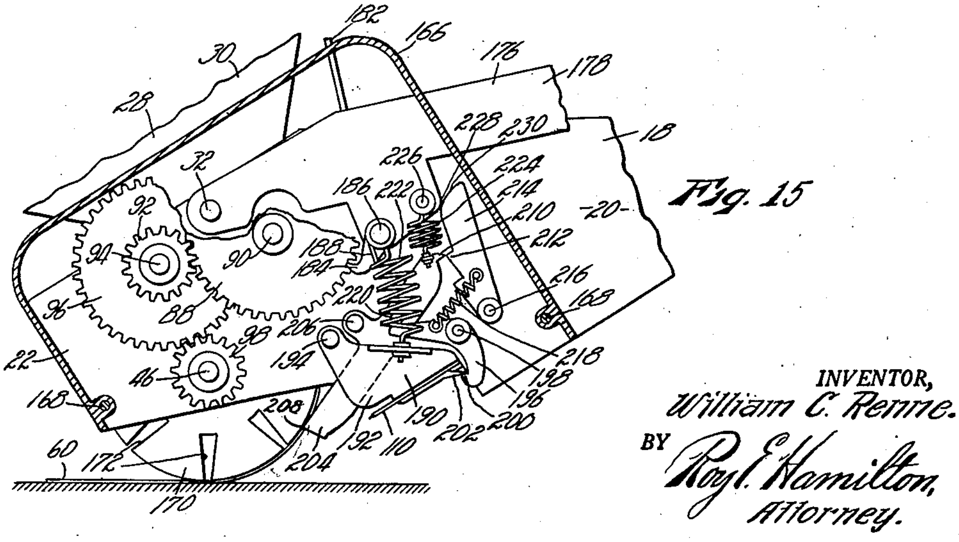
Fig. 15 is a view of the parts shown in Fig. 11, showing the relationship of the parts after the trigger is tripped but before the finer bar has entered one of the drum slots.

The operation of the modified form is substantially as follows. The parts normally have the relative positions shown in Fig. 11. As handle 176 is manually pivoted downwardly, pawl 184 engages gear 88 to turn drum 170 through gears 88, 92, 96, and 98. Tape is thereby drawn from roll 36 between drum 170 and moistening roller 50, and passes around drum 170, whereby it may be applied under pressure to a surface if desired. As handle 176 is depressed, springs 222 and 224 are compressed, and respectively urge blade bracket 190 forwardly and finder bar 204 downwardly. However, since bracket 190 is retained by trigger 196 and finder bar 204 is retained by trigger 214, these parts may not move. As handle 176 approaches the lower limit of its oscillation, cam surface 228 contacts cam surface 230 of trigger 214, pivoting said trigger clockwise as viewed in Fig. 15, against the tension of spring 218. Shoulder 212 of said trigger is thereby disengaged from shoulder 210 of finder bar 204, and said finder bar is urged clockwise by spring 224, as shown in Fig. 15. However, inwardly turned portion 206 of said finder bar then strikes the surface of drum 170 adjacent the side of tape 60, and its pivotal movement is thereby arrested. The parts are then disposed in the relationship shown in Fig. 15.

As handle 176 is still further depressed, drum 170 is still further rotated by the previously described gear train until one of slots 172 of said drum is brought beneath finder bar 204. Portion 208 of said finder bar is then pivoted into slot 172 by spring 224. Simultaneously, pin 220 associated with bar 204 pivots trigger 196 counterclockwise as shown in Fig. 16, against the tension of spring 218. Shoulder 200 of said trigger is thereby disengaged from ear 202 of blade bracket 110 entering slot 172 to cut off tape 60 which is stretched across said slot. The parts then have the relative positions shown in Fig. 16.

As handle 176 is pivoted upwardly, springs 222 and 224 are first fully extended and then serve as tensile members for drawing blade 110 and finder 204 out of slot 172 and to their normal positions. Spring 218 serves to urge triggers 196 and 214 into locking engagement respectively with blade bracket 190 and finder bar 204.

Thus blade 110 cannot be released until finder bar 204 has been engaged in a slot 172, and has positioned said notch to receive said blade. The locking of drum 170 by finder bar 204 also prevents the bunching of the tape which would occur if tape were fed through the device while the blade was in its cutting position. Since no part of the operation of the applier depends upon gravity, even the flow of water from tank 20 to moistening roller 50, it is clear that the applicator could be used in any position.

It is apparent that many minor changes in construction and operation could be made without departing from the spirit of the present invention, and it is therefore desired to be limited only by the scope of the appended claims.

What I claim is:

1. A gummed tape applicator comprising a body member, a drum carried for rotation by said body member and having a relatively narrow strip of gearing disposed circumferentially thereabout, a roller carried for rotation by said body member and urged resiliently against said drum, said roller having a geared section adapted to mesh with the geared section of said drum, said body member being adapted to carry a roll of gummed tape having its end portion passing between said drum and said roller and gripped firmly by said meshing gear sections, and manually operable means carried by said body member for rotating said drum to draw tape from said roll.

2. A gummed tape applicator comprising a body member, a drum carried for rotation by said body member, a moistening roller carried for rotation by said body member and urged resiliently against said drum, said moistening roller being comprised principally of a spongy porous material and having a relatively hard disc interposed thereon to contact said drum firmly, said body member being adapted to carry a roll of gummed tape having its end portion passing between said drum and said roller with its gummed side toward said roller, means for supplying moisture to said roller, and manually operable means carried by said body member for rotating said drum to draw tape from said roll.

3. A gummed tape applicator comprising a body member, a drum carried for rotation by said body member and having a circumferential geared section, a moistening roller carried for rotation by said body member and urged resiliently against said drum, said moistening roller being comprised principally of a spongy, resilient material and having a geared disc interposed thereon adapted to mesh with the geared portion of said drum, said body member being adapted to carry a roll of gummed tape having its end portion passing between said drum and said roller with its gummed side toward said roller, means for supplying moisture to said roller, and manually operable means carried by said body member for rotating said drum to draw tape from said roll between said drum and said roller.

4. In a gummed tape applicator of the class described wherein the tape passes over a moistening roller carried for rotation by a body member, means for supplying moisture to said roller comprising a spongy, porous pad carried by said body member in wiping contact with said roller and having its end portion snugly fitted in a well formed by said body member, a water tank carried by said body member, a tube interconnecting said well and said tank, said tube being formed to present a loop within said tank, and a wick extending through said tube and falling loosely within said tank.

5. In a gummed tape applicator of the class described, wherein tape from a roll carried by a body member passes between a rotatable drum and a rotatable moistening roller resiliently urged against said drum, rigid members associated with said body member to form a slot over which said tape passes after passing between said drum and said roller, a handle pivotally connected to said body member and forming a scissors-type hand grip in combination therewith, means operable by the oscillation of said handle for rotating said drum to draw tape from said roll, a blade pivotally carried by said body member, means operable by said handle at a certain point of its oscillation to pivot said blade to enter said slot to cut off said tape, and means operable by said handle to lock said drum against further rotation substantially at the instant said blade enters said slot.

6. In a gummed tape applicator of the class described wherein tape from a roll carried by a body member passes between a rotatable drum and a rotatable moistening roller resiliently urged against said drum, said drum and said roller having meshing circumferential geared portions adapted to grip said tape, means for supplying water to said moistening roller, a handle pivotally carried by said body member and oscillatable relative thereto, a pair of rigid members carried by said body member and forming a slot therebetween adjacent the surface of said drum over which said tape passes, a blade pivotally carried by said body member, a detent carried by said body member and adapted to project between an adjacent pair of gear teeth of said drum, means normally holding said detent out of engagement with said gear teeth, means operable by the oscillation of said handle for rotating said drum to draw tape over said moistening roller, a spring operable by the pivotal movement of said handle to urge said blade toward said slot, a trigger normally securing said blade against movement, means operable by said handle at a certain point of its oscillation to trip said trigger to release said blade, said blade then entering said slot to cut off said tape, and means operable by said trigger for projecting said detent between an adjacent pair of gear teeth of said drum, thereby locking said drum against rotation.

7. A gummed tape applicator comprising a body member adapted to carry a roll of gummed tape, a drum carried for rotation by said body member and having a plurality of circumferentially spaced apart longitudinal radial slots formed in the peripheral surface thereof, a moistening roller carried by said body member and urged resiliently against said drum, the end portion of said tape passing between said drum and said roller and extending over the outer ends of certain of said slots, means for supplying moisture to said roller, a blade pivotally carried by said body member and adapted to enter selectively the slots of said drum, manually operable means carried by said body member for rotating said drum to draw tape over said moistening roller, means for locking said drum against further rotation and positioning one of the slots thereof to receive said blade, and means for pivoting said blade to enter said slot to cut off said tape.

8. A gummed tape applicator comprising a body member adapted to carry a roll of gummed tape, a drum carried for rotation by said body member and having a plurality of circumferentially spaced apart longitudinal radial slots formed in the peripheral surface thereof, a moistening roller carried by said body member and urged resiliently against said drum, the end portion of said tape passing between said drum and said roller and extending over the outer ends of certain of said slots, means for supplying moisture to said roller, a blade pivotally carried by said body member and adapted to enter selectively the slots of said drum, a handle member pivotally carried by said body member and forming a scissors-type hand grip in combination therewith, a spring compressible by the pivotal movement of said handle to urge said blade toward said drum, a first trigger normally securing said blade against movement, a finder bar pivotally carried by said body member and operable to trip said first trigger when a portion of said finder bar enters one of said drum slots, said finder bar being operable to lock said drum with said slot positioned to receive said blade, a spring compressible by the pivotal movement of said handle to urge said finder bar into engagement with said drum slot, a second trigger normally securing said finder bar against movement, and a cam associated with said handle whereby said second trigger is tripped at a certain point in the oscillation of said handle.

9. In a gummed tape applier of the class described, wherein gummed tape from a roll carried by a body member passes between a rotatable drum and roller resiliently urged together, means for rotating said drum to draw tape from said roll, a blade carried movably by said body member and adapted to sever said tape, resilient means urging said blade toward its cutting position, a trigger normally retaining said blade in its inoperative position, and means for operating said trigger to release said blade.

10. In a gummed tape applier of the class described, wherein gummed tape from a roll carried by a body member passes between a rotatable drum and roller resiliently urged together, means for rotating said drum to draw tape from said roll, a blade carried movably by said body member and adapted to sever said tape, resilient means urging said blade toward its cutting position, a trigger normally retaining said blade in its inoperative position, and means operable by said drum rotating means to operate said trigger to release said blade.

11. In a gummed tape applier of the class described, wherein gummed tape from a roll carried by a body member passes between a rotatable drum and roller resiliently urged together, means for rotating said drum to draw tape from said roll, a blade carried movably by said body member and adapted to sever said tape, resilient means tensioned by said drum rotating means for urging said blade toward its cutting position, a trigger normally retaining said blade in its inoperative position, and means operable by said drum rotating means for operating said trigger to release said blade.

12. In a gummed tape applier of the class described, wherein gummed tape from a roll carried by a body member passes between a rotatable drum and roller resiliently urged together, means for rotating said drum to draw tape from said roll, a blade carried movably by said body member and adapted to sever said tape, resilient means urging said blade toward its cutting position, and means for locking said drum against rotation substantially at the same instant said tape is severed.

13. In a gummed tape applier of the class described, wherein gummed tape from a roll carried by a body member passes between a rotatable drum and roller resiliently urged together, means for rotating said drum to draw tape from said roll, a blade carried movably by said body member and adapted to sever said tape, resilient means urging said blade toward its cutting position, a trigger normally retaining said blade in its inoperative position, and means for operating said trigger to release said blade, and substantially simultaneously locking said drum against rotation.

14. In a gummed tape applier of the class described, wherein gummed tape from a roll carried by a body member passes between a rotatable drum and roller resiliently urged together, means for rotating said drum to draw tape from said roll, a blade carried movably by said body member and adapted to sever said tape, resilient means tensioned by said drum rotating means for urging said blade toward its cutting position, a trigger normally retaining said blade in its inoperative position, a locking member carried movably by said body member and adapted to lock said drum against rotation, resilient means urging said locking member toward its operative position, a trigger normally securing said locking member in its inoperative position, and means operable by said drum rotating means for substantially simultaneously operating both of said triggers to release said blade and said locking member.

WILLIAM C. RENNE.

REFERENCES CITED

The following references are of record in the file of this patent:

UNITED STATES PATENTS

| Number | Name | Date |
|---|---|---|
| Re. 22,981 | Fitch | Mar. 9, 1948 |
| 952,439 | Fancher | Mar. 15, 1910 |
| 1,019,719 | Maynes | Mar. 5, 1912 |
| 1,026,446 | Kennedy et al. | May 14, 1912 |
| 1,178,358 | Thomas | Apr. 4, 1916 |
| 1,227,436 | Hendrix | May 22, 1917 |
| 1,437,841 | Hart | Dec. 5, 1922 |
| 2,031,597 | Gray | Feb. 25, 1936 |
| 2,100,652 | Shimer | Nov. 30, 1937 |

FOREIGN PATENTS

| Number | Country | Date |
|---|---|---|
| 781,470 | France | Feb. 25, 1935 |
| 81,856 | Switzerland | July 16, 1919 |